US006478224B1

(12) United States Patent
Gettys

(10) Patent No.: US 6,478,224 B1
(45) Date of Patent: Nov. 12, 2002

(54) SYMBOLOGY-INDEPENDENT METHOD AND APPARATUS FOR IDENTIFYING POTENTIAL BAR CODE DATA

(75) Inventor: Thomas P. Gettys, Eugene, OR (US)

(73) Assignee: PSC Scanning, Inc., Portland, OR (US)

( * ) Notice: Subject to any disclaimer, the term of this patent is extended or adjusted under 35 U.S.C. 154(b) by 47 days.

(21) Appl. No.: 09/798,792

(22) Filed: Mar. 2, 2001

(51) Int. Cl.[7] .................................................. G06K 7/10
(52) U.S. Cl. ........................... 235/462.19; 235/462.16; 235/462.18
(58) Field of Search ..................... 235/462.19, 462.18, 235/462.16, 462.07, 462.27, 462.12, 462.04

(56) References Cited

U.S. PATENT DOCUMENTS

| 4,000,397 | A |   | 12/1976 | Hebert et al. |            |
|-----------|---|---|---------|---------------|------------|
| 4,058,708 | A | * | 11/1977 | Sherer et al. | 235/462.18 |
| 4,074,114 | A |   | 2/1978  | Steinert et al. |          |
| 4,879,456 | A | * | 11/1989 | Cherry et al. | 235/462.07 |
| 5,028,772 | A | * | 7/1991  | Lapinski et al. | 235/462.12 |
| 5,124,538 | A |   | 6/1992  | Lapinski et al. |          |
| 5,262,625 | A |   | 11/1993 | Tom et al. |            |
| 5,446,271 | A |   | 8/1995  | Cherry et al. |            |
| 5,463,211 | A |   | 10/1995 | Arends et al. |            |
| 5,466,921 | A |   | 11/1995 | Lapinski et al. |          |
| 5,481,098 | A |   | 1/1996  | Davis et al. |            |
| 5,548,107 | A | * | 8/1996  | Lapinski et al. | 235/462.12 |
| 5,600,118 | A | * | 2/1997  | Sato et al. | 235/462.27 |
| 5,872,864 | A | * | 2/1999  | Imade et al. | 382/156 |
| 5,923,023 | A |   | 7/1999  | Arends et al. |            |
| 5,925,868 | A |   | 7/1999  | Arends et al. |            |
| 5,979,763 | A | * | 11/1999 | Wang et al. | 235/462.16 |
| 6,006,991 | A |   | 12/1999 | Faklis et al. |            |
| 6,039,253 | A |   | 3/2000  | Reichenbach et al. |       |
| 6,047,894 | A |   | 4/2000  | Arends et al. |            |
| 6,059,187 | A | * | 5/2000  | Sato et al. | 235/462.16 |
| 6,073,851 | A |   | 6/2000  | Wang |                     |
| 6,124,936 | A | * | 9/2000  | Okamoto | 250/226 |
| 6,145,950 | A | * | 11/2000 | Ohtsuka et al. | 347/15 |
| 6,176,429 | B1 |  | 1/2001  | Reddersen et al. |          |
| 6,247,646 | B1 | * | 6/2001 | Iwaguchi et al. | 235/462.04 |

OTHER PUBLICATIONS

U.S. patent application Ser. No. 09/515,659, Bremer, filed Feb. 28, 2000, pending.
U.S. patent application Ser. No. 09/658,300, Reddersen et al., filed Sep. 08, 2000, pending.

* cited by examiner

Primary Examiner—Thien M. Le
Assistant Examiner—U Chau Le
(74) Attorney, Agent, or Firm—Lyon & Lyon LLP

(57) ABSTRACT

Systems (apparatus and methods) for reading bar code data detect light reflected and/or refracted from a target. The detected light is converted into an electrical signal containing width values that are indicative of widths of light areas and dark areas of the target. Systems for pre-screening data read by a bar code reader determine whether sequences of width values are consistent with potential bar code data by comparing the relative widths of subsequences of light areas and dark areas. If the relative widths are consistent with bar code data, the width values of the sequence being pre-screened are output to a decoder, which attempts to read the sequence of width values. If the relative width values are inconsistent with bar code data, the sequence of width values is not output to the decoder, thereby decreasing the amount of processing the decoder would otherwise be required to perform.

71 Claims, 5 Drawing Sheets

SYMBOLOGY-INDEPENDENT METHOD AND APPARATUS FOR IDENTIFYING POTENTIAL BAR CODE DATA

BACKGROUND OF THE INVENTION

Labels bearing information in any of a number of different bar code formats are commonly affixed to products, packaging, or other items and are used in many applications. It is common, for example, to encode retail product identification information in a bar code format on a product package or a label affixed to a product package. Bar code symbols are also used on a broad range of retail packages for check-out and inventory purposes. A bar code reader, located at the check-out station of a retail establishment for example, may be used by a clerk to enter product identification data from a bar code label into an associated point-of-sale computer system.

Bar codes typically consist of a series of parallel light and dark rectangular areas of varying widths. The light areas are often referred to as "spaces" and the dark areas as "bars," with the bars and spaces arranged and selected to define different characters of a particular bar code.

A bar code label is typically read by a bar code reader, such as a scanner, which illuminates the target containing the bar code label to be read and detects reflected and/or refracted light from the bars and spaces of the bar code. One common method of illuminating the target is by use of a scanning laser beam, in which case a spot of light is swept across the bar code label and the intensity of returned light is detected by a photodetector. The photodetector generates an electrical signal having an amplitude determined by the intensity of the detected light.

Another method for illuminating the target containing the bar code label and detecting return light is by use of a uniform light source and an array of optical detectors connected to an analog shift register (commonly called a charge-coupled device or CCD). Such a CCD imager can be a single line CCD array or else a two-dimensional CCD array. In such a technique, as with a scanning laser, an electrical signal is generated having an amplitude determined by the intensity of the collected light.

Alternately, the bar code reader may generate an electrical signal having an amplitude determined by the intensity of detected light without illuminating the target, as described, for example, in U.S. Pat. No. 6,073,851, which is assigned to the assignee of the present application and hereby incorporated by reference as if set forth fully herein.

In either the laser or CCD technique, the amplitude of the electrical detector signal has one level for dark bars and a second level for light spaces. A relatively large amplitude of the electrical signal indicates a high level of reflected and/or refracted light and, therefore, light areas of a target (such as white spaces of the bar code), while a relatively small amplitude of the electrical signal indicates a low level of reflected and/or refracted light and, therefore, dark areas of a target (such as bars of the bar code).

The widths of light areas and dark areas on the target are measured by signal processing circuitry. The electrical signal is indicative of the widths of dark areas and light areas of the scanned target. As a target is scanned, positive-going transitions and negative-going transitions in the electrical signal occur, signifying transitions between dark areas and light areas (such as bars and spaces). Various techniques for measuring the widths of light areas and dark areas on a target are described in, for example, U.S. Pat. No. 4,000,397 (Hebert et al.), U.S. Pat. No. 5,463,211 (Arends et al.) and U.S. Pat. No. 5,446,271 (Cherry et al.), and in copending patent application Ser. No. 09/658,300 entitled "Multiformat Optical Reader" (filed Sep. 8, 2000 as a continuation of application Ser. No. 09/118,228 filed Jul. 17, 1998), each of which is assigned to the assignee of the present application, and each of which is hereby incorporated by reference as if set forth fully herein.

A decoder attempts to decode the information contained in the electrical signal. Various techniques for reading and processing electrical bar code signals are described in, for example, U.S. Pat. Nos. 4,000,397, 5,463,211 and 5,446,271, each of which is referenced above and incorporated herein.

While the use of bar codes greatly enhances the efficiency of the check-out process in retail establishments and additionally allows the accumulation of sales or inventory data which is important for proper management control, difficulties may be encountered due to the amount of data from the electrical signal that must be processed.

For example, the bar code reader cannot predict where the bar code data will be on the product and therefore must scan any area in which the target bar code might be located. As a result, the bar code reader scans much more area than necessary to read the bar code, including parts of the product that do not contain the bar code. The bar code reader must therefore read and process far more information than the target bar code data. Moreover, this task is made more burdensome by the fact that a large amount of extraneous data resembling bar code data may need to be discriminated from the actual target bar code data.

Typically, the detector will detect light reflected from parts of the product packaging other than the bar code and will output an electrical signal indicative of light areas and dark areas of the packaging that do not represent a bar code. The light areas and dark areas might be found, for example, in text, graphics or other printing that are often found on packaging and which may produce an electrical signal resembling that produced by a bar code.

Because bar code readers typically must process the entire electrical signal, whether produced from the bar code or other areas of the target, to determine which parts represent bar code data, processing time and resources are typically wasted on reading and processing extraneous data. Given that the bar code typically occupies a small portion of a target, much of the electrical signal does not represent bar code data, but still must be processed to determine that fact. This increases the load on the decoder beyond the load that would exist if only bar code data were contained in the electrical signal.

To facilitate determination of what portion of the electrical signal constitutes bar code data, bar codes sometimes include "quiet zones" that border the outermost bars and spaces of the bar code and mark the location of the bar code. Typically, these quiet zones comprise a white area that is substantially wider than the widest bar or space of a particular bar code symbology. The quiet zones are theoretically designed so that they can be easily recognized by the bar code reader. The bar code reader can be programmed to disregard information that is not bounded by the quiet zone.

Quiet zones, however, are not always effective. Sometimes quiet zones are contaminated by dirt, smeared ink, or other particles, so that the bar code reader does not recognize the quiet zone, potentially preventing a successful scan. Other times, the bar code may be printed on the edge of a package, and some portion of the quiet zone may not be printed on the package, potentially preventing a successful scan.

Further, some bar code symbologies do not employ quiet zones at all. Bar code readers that rely on the existence of quiet zones may be unable to read such symbologies.

The difficulties arising from the large amount of data received from the detector may be exacerbated by the number of different bar code symbologies that may be in use. Because a bar code reader at a particular location may need to read bar codes in many different symbologies, the bar code reader circuitry in such a situation must be capable of recognizing and decoding bar codes printed according to any of a variety of symbologies used or expected in a particular application. This requirement presents substantial difficulties since bar codes in common usage vary significantly in their formats. These codes include, for example, Code 3 of 9, Interleaved 2 of 5 Code, Codabar, Code 93, Code 128, the Universal Product Code (UPC), and the European Article Numbering (EAN) code.

Each bar code symbology requires a separate, unique decoding algorithm. Thus, the amount of time required to perform the decoding algorithms increases as the decoder is required to discriminate among more bar code types. Further, because noise present in the optical and analog electronic signal paths can corrupt the data in a given scan, a number of scans of data may be necessary before a good read decision can be made.

Another factor that adds to the burdens of reading and processing bar code data is the typical requirement that such activity must be carried out relatively rapidly, so that as many scans as possible may be carried out in the shortest possible time frame, to increase the chances of obtaining a successful read.

Speed in bar code readers is important because available processing time is short. In a laser scanner, for example, the scanning speed of the moving laser beam is sufficiently high that the bar code reader often must rapidly analyze the electrical scan signal to determine whether a bar code label has been scanned and, if it has, must rapidly analyze the data encoded on the bar code label. It may be possible to use faster hardware to attempt to decrease decoding time, but faster hardware may entail significantly greater cost and increased power requirements, while the market for bar code readers is cost sensitive. Faster hardware is also generally larger in size, possibly requiring larger, bulkier bar code readers and, in handheld scanners, possibly producing a corresponding sacrifice of ergonomics (e.g., size and shape of features). Since processing hardware has size, power and cost limitations, software algorithms that can decrease the amount of processing needed to perform the decoding operation are desirable to improve decoder performance.

U.S. Pat. No. 6,059,187 ("the '187 patent") discloses a system that compares the widths of two adjacent dark areas (that are separated by a single light area) or two adjacent light areas (that are separated by a single dark area), or a light area and an adjacent dark area. The system determines whether or not a ratio of the widths of adjacent light or dark areas falls within a range of 0.2–5.0. The '187 patent discloses that the range is based on the widest bar code element being no more than five times wider than the narrowest bar code element for a particular bar code symbology. Light or dark areas not falling within that range are discarded.

The system disclosed in the '187 patent, however, is prone to being over-inclusive because it compares only adjacent light or dark areas, and does not compare light or dark areas that are separated by more than one other light or dark area. While the relative sizes of non-adjacent light or dark areas may not be within the range of 0.2 to 5, the system of the '187 patent nevertheless deems the areas potential bar code data. For example, consecutive light areas or dark areas may have the following relative widths: 1, 2, 5, 6, and 25. The system disclosed in the '187 patent would deem all of the light or dark areas potential bar code data because all of the areas are between 0.2 and 5 times as wide as areas separated by no more than one other area. For example, the values 1 and 5, 2 and 6, and 5 and 25 all are within the permissible range of ratios. The ratio of the widths of the outermost areas (which have relative widths of 1 and 25), however, is 25. The outermost areas should not be deemed parts of a bar code symbology with light and dark areas that have relative widths of no more than 5. The over-inclusiveness of the '187 system may cause the system to further process more data than might be further processed if the system were improved to compare the relative widths of light and dark areas separated by more than one other light or dark area.

It would therefore be advantageous to provide a system that pre-screens data, reducing the load on the decoder, in a relatively inexpensive and simple manner, and in a manner that is less over-inclusive than existing systems. It would be further advantageous to provide a system that can help the bar code reader to read bar codes that are not bounded by a quiet zone or other such delimiters.

SUMMARY OF THE INVENTION

According to one aspect of the present invention, data indicative of light areas and dark areas on a target is pre-screened to determine if it might represent bar code data and therefore should be further processed. If the data is determined not to potentially represent bar code data, the data is not further processed, reducing the overall amount of processing that would otherwise be required to read the data. Certain techniques as described herein may be found especially suitable for use in bar code scanners which use reflected and/or refracted light to read code made up of bars and spaces.

Briefly described, in one embodiment, a bar code reading system for pre-screening data is operative to identify data that may potentially represent bar code data. Data obtained from optically reading a target is pre-screened by determining whether sequences of data meet a certain predefined condition or conditions. The bar code reading system determines whether the relative widths of a sequence of light areas and dark areas on the target are consistent with one or more bar code symbologies. Data that is identified to potentially represent a bar code is further processed in an attempt to decode the data.

A bar code reader constructed in accordance with techniques disclosed herein preferably works with a variety of bar code symbologies by identifying data that conforms to any of several bar code symbologies. Non-bar code data may be disposed of faster and more efficiently than simply by using the decoding algorithms that otherwise would typically be needed to process the data to determine whether the data represents a bar code.

Preferably, the pre-screening algorithms and/or processes described herein are implemented with a programmed microprocessor. A suitable hardware based apparatus, however, may be constructed to implement them.

Further variations, enhancements and modifications are also described herein.

DETAILED DESCRIPTION OF PREFERRED EMBODIMENTS

Preferred embodiments will now be described with reference to the drawings.

Figure 1:
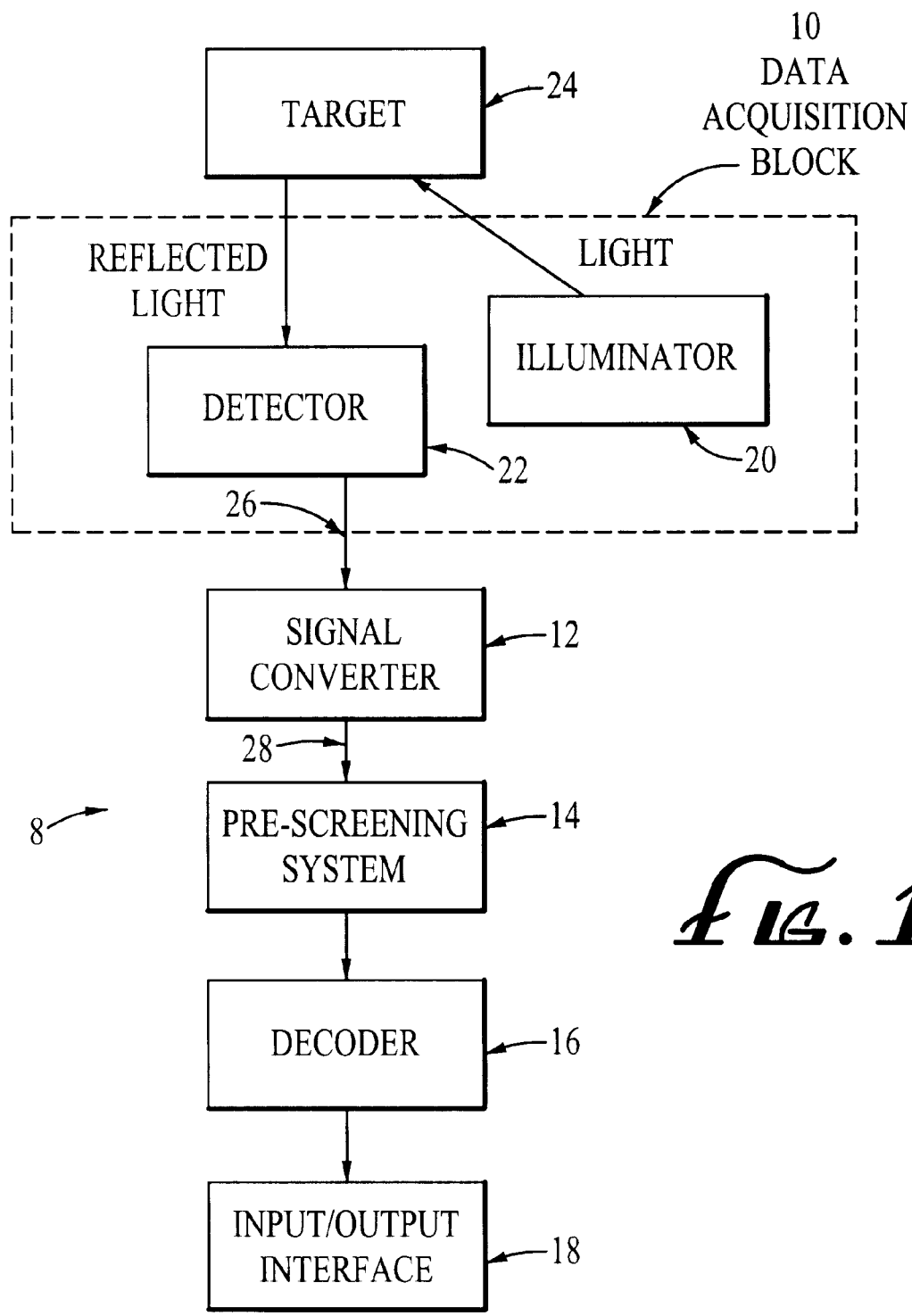
FIG. 1 is a block diagram identifying basic functional components of one embodiment of a bar code reader.

FIG. 1 is a block diagram identifying basic functional components of an embodiment of a bar code reader 8. Although FIG. 1 depicts a hand held scanner, the systems and techniques disclosed herein are applicable to all types of bar code readers, including fixed and multi-line scanners. The bar code reader 8 of FIG. 1 includes a data acquisition block 10, a signal converter 12, a pre-screening system 14, a decoder 16, and an input/output interface 18.

The data acquisition block 10 preferably comprises an illuminator 20 and a detector 22. The illuminator 20 illuminates a target 24, such as a bar code label. The illuminator 20 may comprise, for example, a flying spot laser source, an array of light-emitting diodes (LEDs), an incandescent light or any other suitable light source. In some embodiments, the illuminator 20 may be omitted, as described, for example, in U.S. Pat. No. 6,073,851, which has been incorporated by reference herein.

In some bar code readers, such as flying spot scanners, a beam of light is scanned across the target in different directions. When the beam changes direction, a new scan begins. Some bar code readers recognize changes in scanning direction and may supply information to the pre-screening system 14 regarding transitions in scans from one scan to the next. Other optical readers do not recognize changes in scanning direction and therefore do not supply such information to the pre-screening system 14. The pre-screening process may be carried out differently depending on whether information regarding scan transitions is available to the pre-screening system 14, as further described hereinafter.

The detector 22 detects light reflected and/or refracted from the target 24. The detector 22 preferably comprises, for example, a photodetector or a CCD linear sensor, but it may also be embodied as a two-dimensional CCD array, or a linear or multi-dimensional CMOS array.

Because the dark areas of the target 24 have lower reflectivity than the light areas of the target 24, the amount of reflected light will be greater when light from the illuminator 20 is incident upon a light area than when it is incident upon a dark area of the target 24. Because the darker "bars" of the barcode have lower reflectivity than the lighter "spaces" between the bars, the amount of reflected light will vary depending on whether light from the illuminator 20 is incident upon a bar or a space.

The detector 22 detects the amount of light reflected and/or refracted off the target 24 and generates an electrical detector signal 26 having an amplitude determined by the intensity of the reflected and/or refracted light. Accordingly, the detector signal 26 has peaks and valleys that correspond in width to the physical widths of relatively lighter and relatively darker areas of the target 24. In optical readers that recognize transitions between scans, the electrical signal 26 may also contain information regarding transitions between scans. The electrical signal 26 may contain a marker or be interrupted to signify a new scan, or a separate signal (not shown) may communicate to the pre-screening system 14 the point at which one scan ends and another begins.

The detector signal 26 is provided to a signal converter 12, which converts the detector signal 26 into a width signal 28. The structure and function of the signal converter 12 is described in greater detail hereinafter.

The width signal 28 may be provided to a memory (not shown) (e.g., a first-in first-out (FIFO) buffer). The memory or buffer may store width signal data for a complete scan pattern or for a portion thereof—e.g., a sliding window of width signal data.

In a preferred embodiment, a pre-screening system 14 is connected to the signal converter 12 or else accesses the memory or buffer storing the width signal data. The pre-screening system 14 thereby may obtain the width signal 28 from the signal converter 12, or may read width signal data from a memory or buffer if such is employed. Prior to decoding, the pre-screening system 14 analyzes the width signal 28 or width signal data from a memory to determine whether the information potentially represents a bar code. The pre-screening process and the structure and function of the pre-screening system 14 is described in greater detail hereinafter.

The pre-screening system 14 outputs to a decoder 16 those portions of the width signal 28 that potentially represent a bar code. A memory or buffer (not shown) may be interposed between the pre-screening system 14 and the decoder 16 and store the potential bar code portions of the width signal 28. The decoder 16 reads the pre-screened width signal from the pre-screening system 14, or from the memory if one is employed, and processes the data to attempt to decode the data.

The pre-screening system 14 and decoder 16 preferably are implemented using a microprocessor or microcontroller (uP/uC). The design of uP/uC-based decoders is generally well known in the field of bar code readers. Alternatively, pre-screening systems or decoders based on, for example, microprogrammed bit-slice hardware, digital signal processors, or hard-wired control logic may be used instead of a uP/uC-based pre-screening system or decoder. The pre-screening system 14 and decoder 16 preferably further comprise a sufficient amount of memory to store the necessary program code and data. The pre-screening system 14 and decoder 16 may be implemented in a single uP/uC, or, alternately, may be separate components.

The decoder 16 may be programmed with algorithms for decoding bar codes of any type. Some decoding techniques are disclosed in, e.g., U.S. Pat. No. 4,879,456, which is assigned to the assignee of the present application and hereby incorporated by reference as if set forth fully herein.

The decoder 16 may output data across the input/output interface 18 to a host computer or some other recipient which utilizes the decoded information. The pre-screening system 14 and decoder 16 need not be resident in the same device as the other components shown in FIG. 1, but may alternatively be located with the host system. Alternatively, the decoder 16 may reside with the host system.

Figure 2:
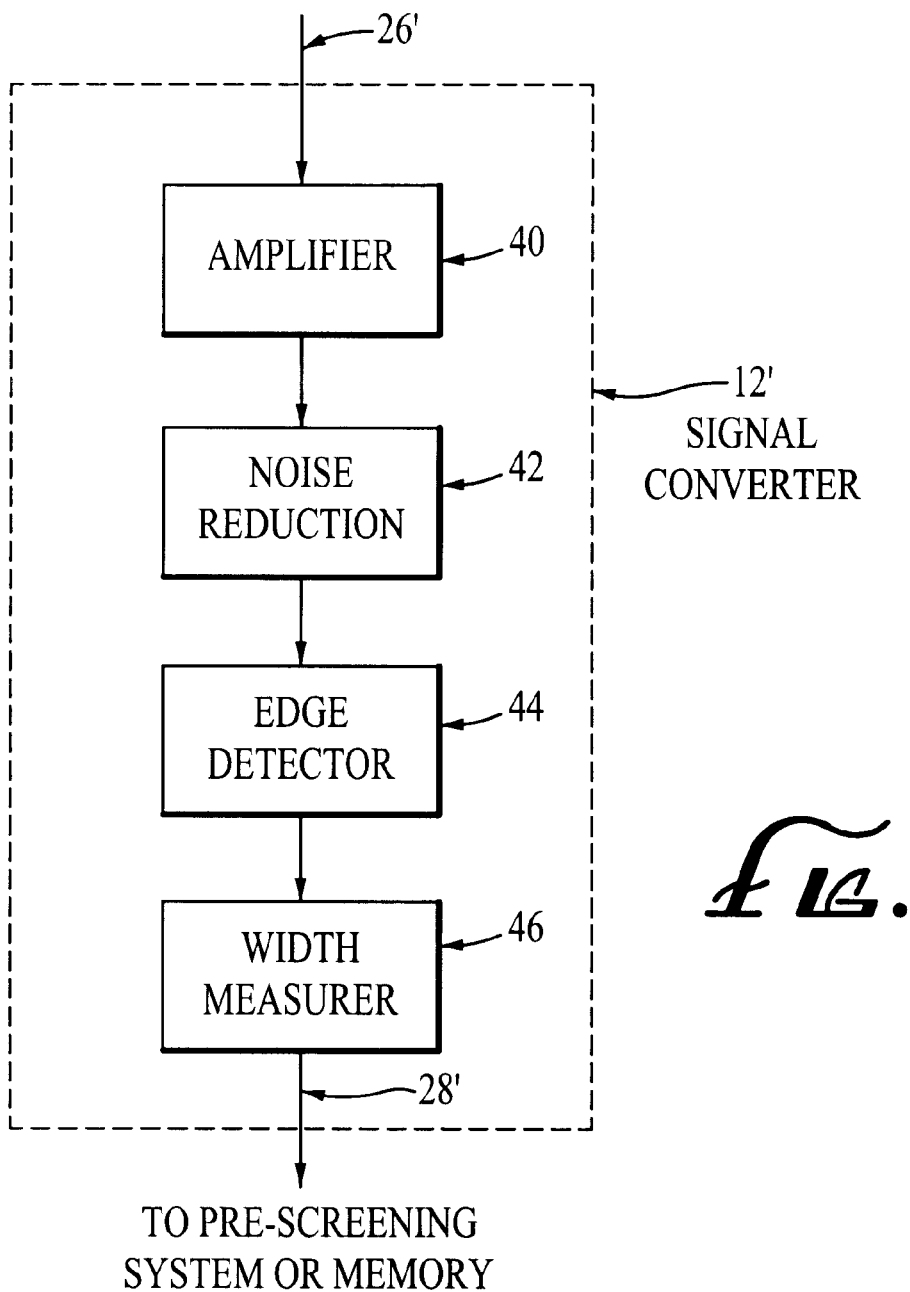
FIG. 2 is a block diagram illustrating signal processing features that may be incorporated, for example, in the signal converter of FIG. 1.

FIG. 2 is a block diagram illustrating signal processing features that may be incorporated, for example, in the signal converter of FIG. 1. In FIG. 2, a signal converter 12' receives the detector signal 26', converts it into a width signal 28', and outputs the width signal 28' either to a pre-screening system (e.g., the pre-screening system 14 in FIG. 1) or to a memory that stores width signal data prior to pre-screening of the data. The signal converter 12' preferably includes an amplifier 40, a noise reduction block 42, an edge detector 44, and a width measurer 46. Additional details of a suitable signal converter 12' are disclosed in U.S. Pat. Nos. 5,463,211 and 4,000,397, and in copending patent application Ser. No. 09/658,300, all of which are referenced above and incorporated herein.

In the signal converter 12' shown in FIG. 2, the amplifier 40 preferably functions to amplify the detector signal 26' as necessary. The noise reduction block 42 preferably functions to eliminate or reduce edges in the amplified detector signal attributed to noise, and may operate for example, by discarding or ignoring edges detected whenever the first derivative of the amplified detector signal is below a threshold value. Preferably, the detector signal 26' is amplified before it is noise-reduced, but the signal 26' may alternately be noise-reduced before it is amplified. The amplified, noise-reduced detector signal is then output to an edge detector 44.

Positive-going and negative-going transitions in the detector signal 26' (as well as in the processed—i.e., amplified and noise-reduced—version thereof) signify transitions between light areas and dark areas of the target. The edge detector 44 preferably detects the location of these transitions in its input signal. The edge detector 44 may locate the edges of the signal output from the noise reduction block 42 using any of a variety of techniques that are well known in the art. Suitable techniques of edge detection are described, for example, in U.S. Pat. Nos. 5,463,211 and 4,000,397, and in copending patent application Ser. No. 09/658,300, all of which are referenced above and incorporated herein. For example, the edge detector 44 may locate edges of the signal by detecting when the second derivative of the signal is zero.

The edge detector 44 preferably outputs a binary signal which transitions between high and low output states each time a transition is detected between a relatively dark area and a relatively light area of the target. The edge location information contained in the binary signal is provided to the width measurer 46, which determines the relative widths of the darker and lighter areas of the target.

The width measurer 46 preferably comprises a timer or counter for measuring the length of time between transitions in the binary signal output from the edge detector 44. These time segments correspond to the relative widths of the dark and light areas of the target. The measurer 46 outputs a width signal 28' comprised of a series of width values that are indicative of the widths of light areas and dark areas of the target. The width signal 28' may be run-length encoded, and may be output to either a memory that stores the width signal prior to outputting the signal to a pre-screening system, or directly to the pre-screening system. Various techniques for measuring these widths are described in, for example, U.S. Pat. Nos. 4,000,397, 5,463,211 and 5,446,271, and in copending patent application Ser. No. 09/658,300, each of which is referenced above and incorporated herein.

Figure 3:
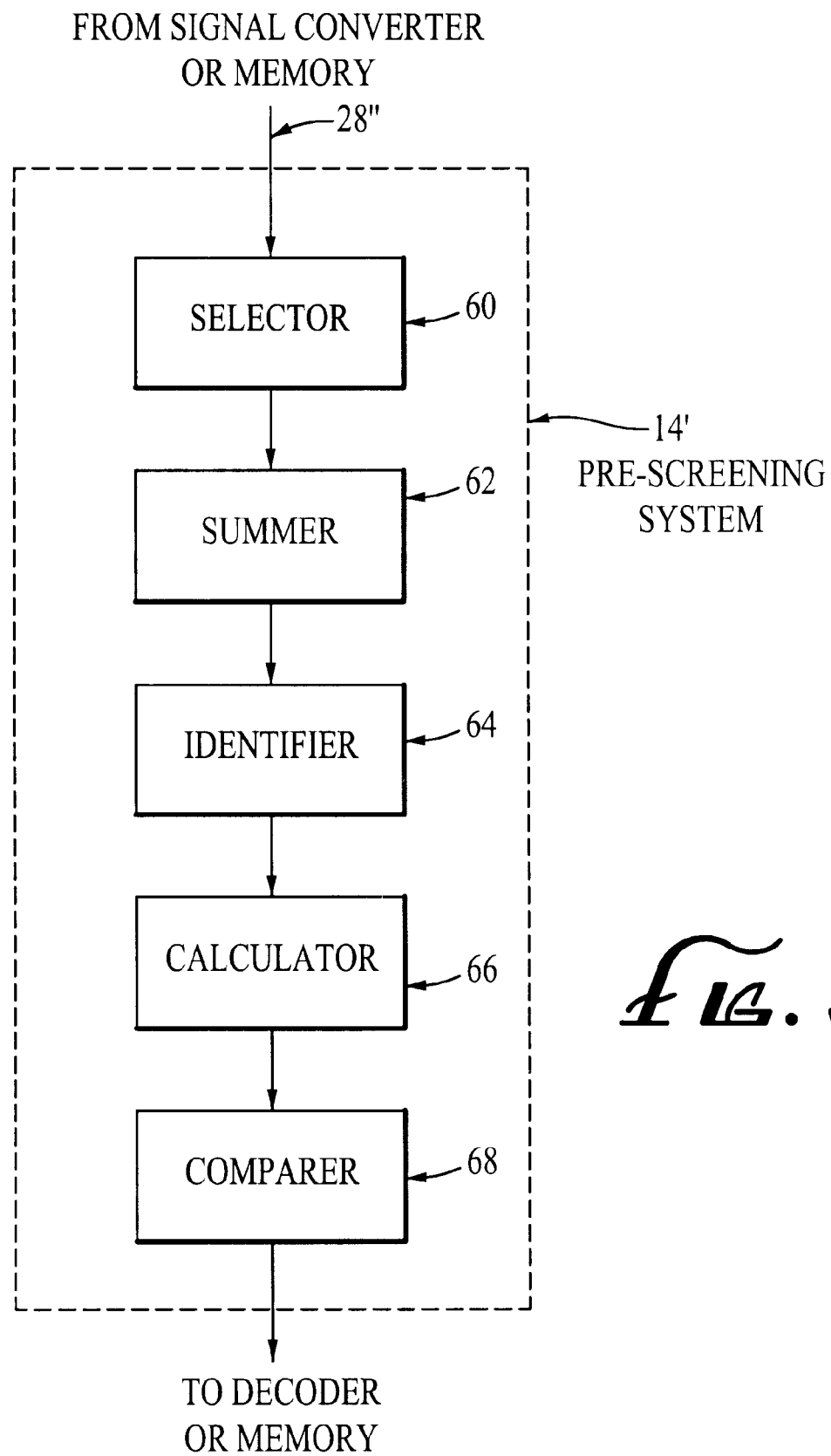
FIG. 3 is a block diagram illustrating one embodiment of a pre-screening system as may be used, for example, in connection with the bar code reader shown in FIG. 1.

FIG. 3 is a block diagram illustrating one embodiment of a pre-screening system as may be used, for example, in connection with the bar code reader shown in FIG. 1. According to the embodiment illustrated in FIG. 3, a pre-screening system 14' receives a width signal 28" from, e.g., a signal converter or from a memory or buffer if one is employed. The pre-screening system 14' then identifies portions of the width signal 28" that may potentially represent a bar code, and preferably outputs only the potential bar code data either to the decoder or to a memory that stores the potential bar code data prior to processing of the data by the decoder, while discarding the non-bar code data. The pre-screening system 14' preferably includes a selector 60, a summer 62, an identifier 64, a calculator 66, and a comparer 68. A preferred operation of the pre-screening system components shown in FIG. 3 is described in greater detail below, in connection with the methodology shown in FIG. 4.

Figure 4:
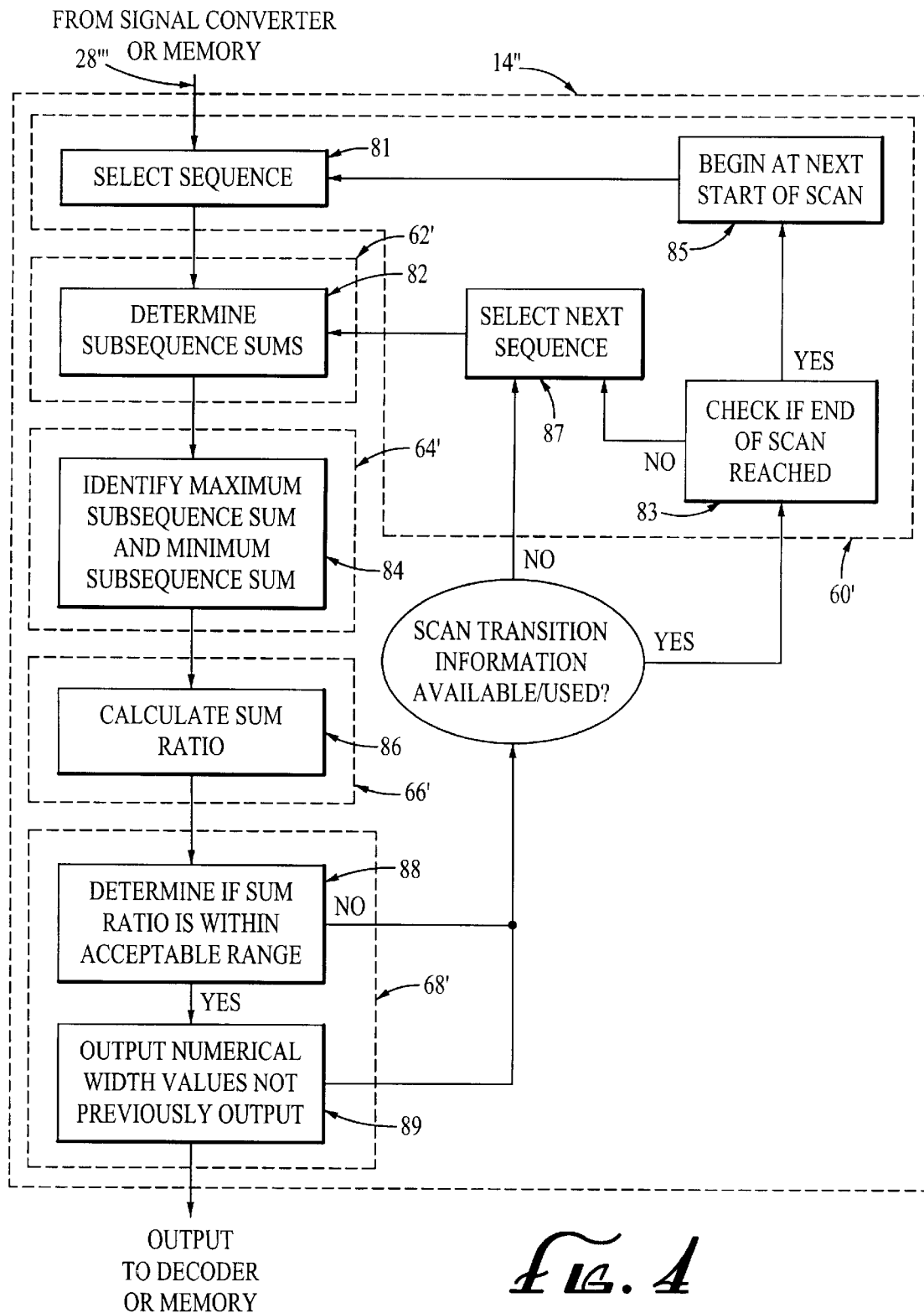
FIG. 4 is a flowchart illustrating preferred pre-screening processes and the components that carry out various aspects thereof.

FIG. 4 is a flowchart illustrating preferred pre-screening processes, and identifies the components of the pre-screening system 14" that preferably carry out various aspects of the pre-screening processes. As illustrated in FIG. 4, a width signal 28'" is received from a signal converter (e.g., as shown in FIG. 1), or from a memory or buffer if one is employed. This width signal 28'" is generally comprised of a series of width values that indicate the relative widths of the light areas and dark areas of the target.

The pre-screening process begins by selecting a sequence of width values from the width signal, as indicated by step 81. As indicated by the dashed lines, a selector 60' preferably carries out this step 81. When implemented in a bar code reader that recognizes transitions between different scans, the selector 60' preferably begins by selecting the first sequence occurring at the start of a scan. When implemented in a bar code reader that does not recognize transitions between scans, the selector 60' preferably selects the first sequence occurring in the width signal, without regard to whether the sequence is the first sequence in a scan.

Figure 5:
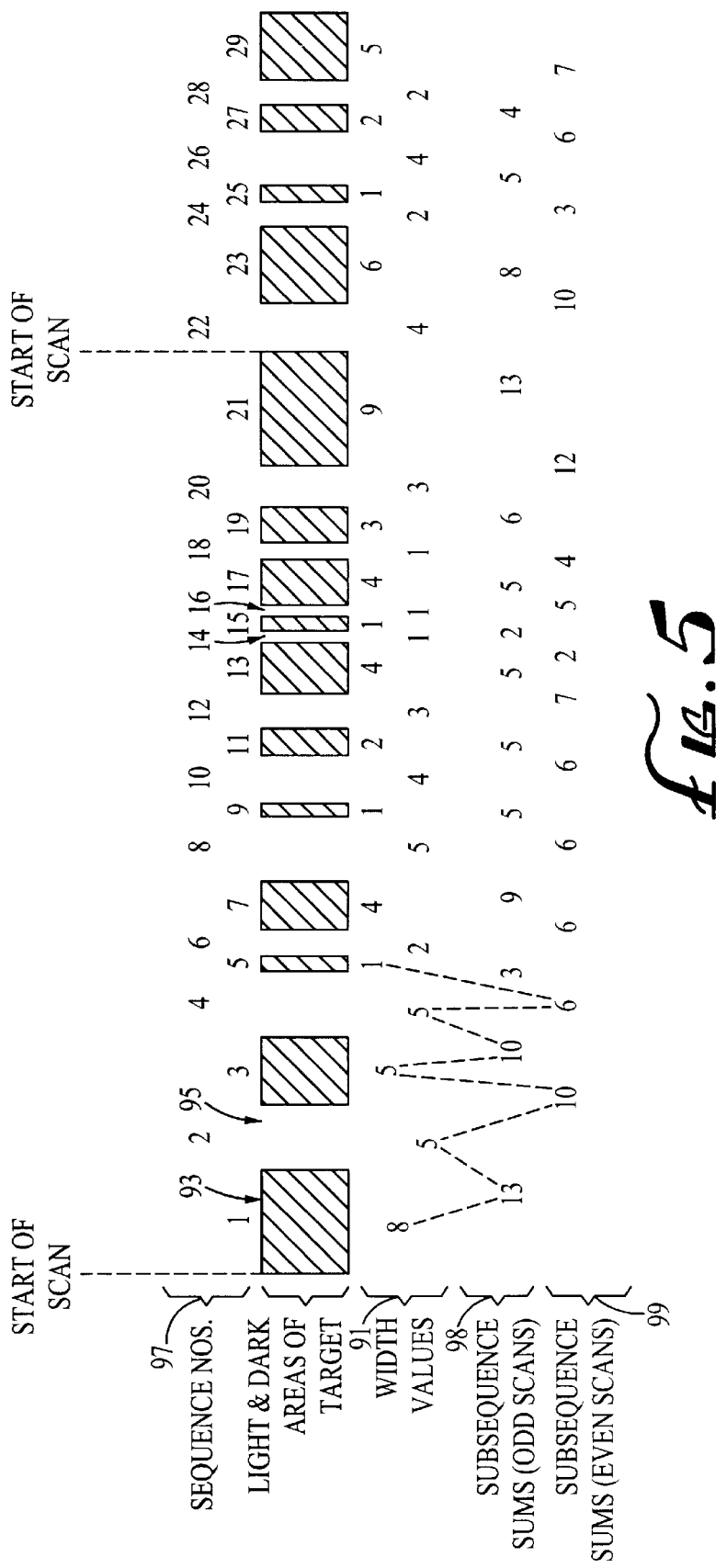
FIG. 5 depicts light areas and dark areas of a hypothetical target and the width signal data obtained therefrom.

Each sequence contains a number of width values that occur consecutively in the width signal. The width values contained in each sequence are distributed into subsequences of width values. Each subsequence contains a number of consecutive width values. FIG. 5 illustrates an example of width data that may be processed according to the pre-screening process of FIG. 4. In the example of FIG. 5, there are eighteen width values 91 in each sequence. The eighteen width values 91 are distributed into nine subsequences, each subsequence containing two width values 91.

Referring again to FIG. 4, after the selector 60' selects a sequence of width values to be pre-screened, a summer 62' preferably determines subsequence sums for each subsequence of width values contained in the sequence, as indicated by step 82. Each subsequence sum is the sum of the width values contained in the subsequence. The pre-screening system 14" may store these sums in a memory (not shown) for use with subsequent sequences to avoid duplicative calculations of the sums.

After subsequence sums are determined in step 82, a maximum subsequence sum and a minimum subsequence sum preferably are identified by an identifier 64', as indicated by step 84. A sum ratio, which is a ratio of the maximum subsequence sum and the minimum subsequence sum, is then calculated by a calculator 66', as indicated by step 86. The sum ratio may be either the maximum subsequence sum divided by the minimum subsequence sum, or, alternately, the minimum subsequence sum divided by the maximum subsequence sum.

A subsequence ratio is to be distinguished from a sum ratio. As described above, the sum ratio is a ratio of the maximum subsequence sum and the minimum subsequence sum. A subsequence ratio, on the other hand, is a ratio of any subsequence sum (not necessarily the maximum or the minimum subsequence sum) in the sequence to any other subsequence sum in the sequence being pre-screened. Thus, a sum ratio is a particular kind of subsequence ratio.

The sum ratio is compared with a range of acceptable sum ratios, as indicated by step 88. A comparer 68' preferably carries out this step 88. The acceptable range is bounded by a minimum sum ratio and a maximum sum ratio. According to a preferred technique, if the sum ratio is the maximum subsequence sum divided by the minimum subsequence sum and has a value that is less than or equal to the maximum sum ratio, the width values in the sequence being processed are output to a decoder (unless the same width values have already been output to the decoder in a previous step), as indicated by step 89. Alternately, if the sum ratio is the minimum subsequence sum divided by the maximum subsequence sum and has a value that is greater than or equal to the minimum sum ratio, the width values in the sequence being processed are output to a decoder (unless the same width values have already been output to the decoder in a previous step), as indicated by step 89.

Since pre-screening has just begun in this example, however, none of the width values would have been output previously in an earlier pre-screening step and all of the width values in the sequence under consideration would be output if the sum ratio is within the range of acceptable sum ratios. If the sum ratio is outside the range, the numbers are not output to the decoder and the decoder is saved the effort of attempting to further process data that is determined not to potentially represent bar code data.

Using the sum ratio insures that all subsequence ratios contained in the sequence being pre-screened are within the range of acceptable sum ratios. Because calculating the sum ratio with a maximum subsequence sum and a minimum subsequence sum results in the highest possible or lowest possible ratio in the sequence, all subsequence ratios of the sequence will be within the range of acceptable sum ratios so long as the sum ratio is within the range.

For example, if the sum ratio is the maximum subsequence sum divided by the minimum subsequence sum, and the sum ratio is less than the maximum permissible sum ratio, then all of the subsequence ratios in the sequence will also be less than the maximum sum ratio and thus meet the condition used to pre-screen the data. If the sum ratio is the minimum subsequence sum divided by the maximum subsequence sum, and the sum ratio is greater than the minimum permissible sum ratio, then all of the subsequence ratios in the sequence will also be greater than the minimum sum ratio and thus meet the pre-screening condition. Accordingly, there is no need for the purposes of pre-screening as disclosed herein to analyze any subsequence ratios other than the sum ratio.

The range of acceptable sum ratios may be selected according to the maximum allowable width ratios of the bar code symbologies which the bar code reader is configured to read. The range is preferably selected so that the pre-screening system 14" works with a variety of bar code symbologies and is therefore symbology-independent to at least some degree. The maximum sum ratio should be at least as high as the highest ratio of bar and space widths permitted by a bar code symbology the bar code reader is designed to recognize. Likewise, the minimum sum ratio should be at least as low as the lowest ratio of bar and space widths permitted by a bar code symbology the bar code reader is designed to recognize. For example, many binary symbologies require that the widest bar or space will be no more than 3.4 (three and four tenths) times wider than the narrowest bar or space. Many multiwidth symbologies have a maximum wide-to-narrow ratio of 4.0 (four).

Due to poor print quality or contamination, however, actual bar codes may vary somewhat from the specifications of the symbology. To allow for reading such out-of-specification bar codes, the maximum ratio may be set at some level higher than the maximum ratio permitted by the bar code symbology and the minimum ratio may be set at some level lower than the minimum ratio permitted by the bar code symbology. In this example, the maximum sum ratio is preferably set at 5.0 (five) and the minimum sum ratio is preferably set at 0.2 (two-tenths) to encompass many existing bar codes and to compensate for code irregularities. The acceptable range may be fixed, or alternately, may be adjusted if, for example, the target bar code symbologies are re-programmed or otherwise dynamically changed.

A process carried out according to the steps illustrated in FIG. 4 may have the advantageous effect of screening out data that clearly cannot comprise bar code because the width ratio information does not conform to a known bar code symbology.

After the pre-screening system 14" pre-screens a sequence of width values according to the preceding steps, the next step depends on whether or not the pre-screening system 14" is implemented in a scanner that recognizes transitions between scans. If scan transition information is available and is used by the pre-screening system 14", then the selector 60' preferably checks whether the end of a scan has been reached (i.e., whether the sequence most recently pre-screened is the last complete sequence of a scan), as indicated by step 83. The selector 60' may check for the end of a scan by, e.g., recognizing information pertaining to transitions between scans, such as a start-of-scan signal or end-of-scan signal that may be incorporated into the electrical signal or the width signal 28'" or otherwise supplied to the selector 60'. If the end of the scan has not been reached, the selector 60' selects another sequence of width values contained in the same scan, preferably the next consecutive sequence, as indicated by step 87, and the pre-screening system 14" repeats the preceding steps. If the end of the scan has been reached, the selector 60' moves on to the next scan and preferably selects the first sequence of width values commencing at the start of the new scan, as indicated by step 85, and repeats the preceding steps.

If scan transition information is not available to or is not used by the pre-screening system 14", the step 83 of checking whether the end of a scan has been reached is not carried out (and step 85 also is not carried out). Instead, the selector 60' preferably selects the next consecutive sequence as indicated by step 87 without regard to whether the next sequence is contained in a different scan than the previous sequence. The applicable preceding steps are repeated for each sequence, preferably until the pre-screening system 14" has pre-screened all of the sequences of the width signal.

FIG. 5 depicts light areas 95 and dark areas 93 of a hypothetical target and illustrates how preferred pre-screening systems may process a width signal comprised of width values 91 to identify data that potentially represents a bar code. In this example, the relative widths of light areas 95 and dark areas 93 are represented by a sequence of Arabic numerals appearing just below each light area 95 and dark area 93. These numerals correspond to the width values 91 contained in the width signal that is received by the pre-screening system from the signal converter. The widths may also be represented by other means, such as, e.g., by binary numbers. A memory or buffer, as previously noted, may be interposed between the width signal and the pre-screening system to store data from the width signal prior to pre-screening.

In FIG. 5, each light area 95 and dark area 93 is labeled with a sequence number 97 appearing just above each light area 95 and dark area 93. The sequence numbers 97 indicate the relative position of each light area 95 and dark area 93 on the target and also indicate the relative position of each width value 91 in the width signal. The portion of the width signal that is shown in FIG. 5 has twenty-nine width values 91, labeled consecutively with sequence numbers 97 one through twenty-nine. Although a width signal might actually include hundreds of, or even more, width values 91, this example shows a much smaller sample simply for purposes of illustrating the techniques described herein.

A selector (such as the selector 60' indicated in FIG. 4) selects a sequence of width values 91. In this example, the number of width values 91 contained in each sequence is eighteen. The eighteen consecutive width values 91 are distributed among nine subsequences of width values 91. Each subsequence contains two consecutive width values 91. Including two width values 91 in each subsequence helps compensate for bar code irregularities such as smeared printing. If, for example, a dark area 93 is smeared into an adjacent light area 95 that is included in the same subsequence, the pre-screening system will still recognize the width values 91 to potentially represent a bar code if the combined width of the smeared dark area 93 and light area 95 is within certain limits. Using two width values 91 in a subsequence has an averaging effect whereby the pre-screening system effectively uses the average width of the dark area 93 and light area 95 contained in the subsequence.

This averaging effect, and the resulting compensation for bar code irregularities, can be even greater if each subsequence contains more than two width values 91. The pre-screening system, however, may then identify more width values 91 to potentially represent a bar code due to the averaging effect that is caused by summing width values 91, and accuracy may decrease due to over-inclusiveness. Alternately, subsequences containing one width value 91 may be used, but there will be no averaging effect to compensate for bar code irregularities as described above.

Still referring to FIG. 5, the first sequence processed by the pre-screening system preferably commences with the first width value 91 of the width signal. In this example, the first sequence selected by the pre-screening system would contain subsequences having width values 91 with the following sequence numbers 97: 1 and 2; 3 and 4; 5 and 6; and so on through 17 and 18. The summer calculates the sums of all the width values 91 contained in each subsequence. In this example, the subsequence sums 98 would have, in sequence, the following values: 13, 10, 3, 9, 5, 5, 5, 2, and 5. The width values 91 used to calculate some of the subsequence sums 98 are indicated in FIG. 5 by dotted lines drawn from width values 91 to the subsequence sums 98 that include those width values 91. These subsequence sums 98, once calculated, can be stored to a memory for later use to avoid duplicative calculations, as explained hereinafter.

After subsequence sums 98 have been calculated, the identifier identifies the maximum subsequence sum, which is the subsequence sum 98 with the highest value in the sequence under consideration. In this case, the maximum subsequence sum has a value of 13. The identifier also identifies the minimum subsequence sum, which is the subsequence sum 98 with the lowest value in the sequence. In this case, the minimum subsequence sum has a value of 2. The calculator then calculates a sum ratio, which in this example is the maximum subsequence sum divided by the minimum subsequence sum. The sum ratio is 13/2, or 6.5. As explained above, the sum ratio alternately may be calculated as the minimum subsequence sum divided by the maximum subsequence sum.

The comparer compares the sum ratio with the maximum sum ratio. There is no need to compare the sum ratio with a minimum sum ratio because the sum ratio of this example will always be equal to or greater than the minimum sum ratio. If the sum ratio is less than or equal to the maximum ratio, the sequence is output to the decoder for further processing, except that width values 91 that have already been output to the decoder preferably are not again output to the decoder. Outputting the same width values 91 to the decoder more than once would increase the processing the decoder must perform to attempt to read the potential bar code data.

In this example, if the sum ratio exceeds the maximum ratio, the width values 91 of the sequence being pre-screened are not output to the decoder. The sum ratio of 6.5 exceeds the maximum of 5 and the pre-screening system does not output to the decoder any of the width values 91 in this first sequence.

After processing the first sequence as described above, the pre-screening system analyzes another sequence in the width signal. Preferably, the pre-screening system analyzes sequences consecutively as they occur in the width signal, beginning with a first sequence and continuing consecutively to a last sequence. Alternately, the pre-screening system may analyze sequences of data in a non-consecutive fashion, otherwise operating as described above, so long as all sequences are pre-screened. For example, the pre-screening system may begin by pre-screening the last sequence, then the second sequence, then the fifth sequence, and so on, so long as all the sequences—from the first sequence to the last sequence—are analyzed. If all of the sequences are not pre-screened, potential bar code data may be missed by the pre-screening system and will not be output to the decoder. Pre-screening of non-consecutive sequences, while possible, may complicate and increase processing in order to rearrange the sequences to represent the physical target.

Consecutive sequences preferably are staggered either by one width value or, alternately, by the number of width values contained in a subsequence. In cases where consecutive sequences are staggered by one width value, a subsequent sequence contains all the width values contained in a previous sequence except the first width value in the previous sequence. In cases where consecutive sequences are staggered by the number of width values contained in a subsequence, a subsequent sequence contains all the width values contained in a previous sequence except the width values contained in the first subsequence of the previous sequence.

In this example, consecutive sequences are staggered by one width value and the second sequence commences with the second width value 91 of the width signal. This second sequence overlaps and contains all the width values 91 of the first (previous) sequence other than the first width value 91 of the first sequence. In this example, the second sequence is comprised of the pairs of width values 91 with the following sequence numbers 97: 2 and 3; 4 and 5; 6 and 7; and so on through 18 and 19.

If sequences were alternately staggered by the number of width values contained in a subsequence, such that a first and second sequences would share subsequences, the second consecutive sequence would comprise the pairs of width values 91 with the following sequence numbers 97: 3 and 4; 5 and 6; 7 and 8; and so on through 19 and 20.

In this example, the subsequence sums 99 are calculated to be: 10, 6, 6, 6, 6, 7, 2, 5, and 4, respectively. The maximum sum is 10 and the minimum sum is 2, resulting in a sum ratio of 5, which is equal to the maximum sum ratio of 5. Because the sum ratio is less than or equal to the maximum sum ratio and none of the width values 91 have been output to the decoder, all the width values 91 contained in this second sequence are output to the decoder.

The pre-screening system preferably then analyzes the next consecutive sequence of data, again advancing one sequence number 97 in this example. This third sequence is comprised of the pairs of width values 91 with the following sequence numbers 97: 3 and 4; 5 and 6; 7 and 8; and so on through 19 and 20. The pre-screening system determines the subsequence sums 98 to be 10, 3, 9, 5, 5, 5, 2, 5, and 6, respectively.

The first eight of these nine subsequence sums 98 are the same subsequence sums 98 calculated for the first sequence. To avoid duplicating computations, the pre-screening system may employ a memory to store subsequence sums 98 99 for use in subsequent sequences. Only the last subsequence sum 98 of the third sequence will need to be calculated if a memory is used because that sum includes two width values 91 that are not included in the first sequence. Similarly, the fifth consecutive sequence of width values 91 has the same subsequence sums 98 as the third sequence, except for the last subsequence sum 98 of the fifth sequence, which will need to be calculated even if a memory is used. Other odd-numbered scans likewise can use subsequence sums 98 calculated for previous odd scans.

The same is true for the even-numbered scans in this example. For example, all except the last subsequence sum 99 of the fourth scan will be the same as the subsequence sums 99 of the second scan. To indicate that the same subsequence sums 98 99 may be used for different sequences, the subsequence sums 98 that are used in odd-numbered sequences (e.g., first, third, and fifth sequences) are aligned in a first row and the subsequence sums 99 that are used in even-numbered sequences (e.g., second and fourth sequences) are aligned in a second row.

It is noted, however, that none of the subsequence sums 99 from even-numbered sequences would be calculated if the consecutive subsequences were staggered by the number of width values in a subsequence (in this case, two width values) rather than by one width value as in this example. In such a case, the even-numbered sequences would not be analyzed and only the subsequence sums 99 from the odd-numbered sequences would be calculated.

For this third sequence, the maximum sum is 10 and the minimum sum is 2, resulting in a sum ratio of 5, which is equal to or less than the maximum sum ratio of 5. Because the sum ratio is equal to or less than the maximum sum ratio, any width values 91 of the sequence that have not been output to the decoder are now output to the decoder. Because the width values 91 with sequence numbers 97 three through nineteen have already been output as part of the preceding (second) sequence, only the width value 91 with sequence number 97 twenty (which has a value of 3 in this case) is output to the decoder.

The pre-screening process continues, each time incrementing the sequence by one sequence number 97 in this example. The next sequence contains the subsequences having width values 91 with the following sequence numbers 97: 4 and 5; 6 and 7; 8 and 9; and so on through 20 and 21. The subsequence sums 99 of this fourth sequence are calculated or otherwise determined (such as from a memory) to be 6, 6, 6, 6, 7, 2, 5, 4, and 12, respectively. The first eight subsequence sums 99 are the same subsequence sums 99 used in the second sequence. If the subsequence sums 99 of the second sequence are stored in a memory, only one additional subsequence sum 99 need be calculated for this fourth sequence, namely, the pair of width values 91 with sequence numbers 97 twenty and twenty-one.

In this fourth sequence, the maximum subsequence sum is 12 and the minimum subsequence sum is 2, resulting in a sum ratio of 6, which is greater than the maximum sum ratio of 5. As the maximum sum ratio has been exceeded, the width values 91 contained in this fourth sequence are not output to the decoder, although some of the width values 91 were output to the decoder in the previous step whereby the second sequence was analyzed.

In this example, the width values 91 with sequence numbers 97 two through twenty have been pre-screened as a block of potential bar code data. Additional blocks of potential bar code data might later be detected, perhaps during a scan of a different area of the target or a different target. To prevent confusing different blocks of potential bar code data which may be read from different bar codes or from different scans, the pre-screening system preferably marks separate blocks of potential bar code data. Such marking can be made to occur when a sequence being pre-screened has a sum ratio within the permissible sum ratio range and the next sequence does not. The mark may be placed after the last sequence that meets the bar code condition, which in this example would be after the width value 91 with sequence number 97 twenty.

In scanners that recognize transitions between scans, the pre-screening system preferably continues analyzing consecutive sequences until the end of a scan is reached, i.e., until the last width value 91 of the sequence most recently processed is the last width value 91 of the scan. After the pre-screening system pre-screens all the sequences contained in a single scan, the pre-screening process preferably begins pre-screening again at the beginning of the next scan by analyzing a sequence that commences with the first width value 91 of this next scan. FIG. 5 indicates that a new scan begins with the width value 91 having sequence number 97 twenty-two. In this example, the end of the first scan is reached with the fourth sequence. After pre-screening the first scan (which contains width values 91 with sequence numbers 97 one through twenty-one), the pre-screening process begins again with the first sequence of the next scan (which begins with the width value 91 labeled with sequence number 97 twenty-two) and repeats the applicable preceding steps.

Alternatively, the pre-screening system may process the width signal continuously, without restarting the pre-screening process at the beginning of each scan, as occurs in bar code readers that do not recognize transitions in scans. In instances where a scan begins or ends on the barcode itself, however, failing to restart the pre-screening process at the beginning of a scan may inhibit accurate scanning. In this example, a pre-screening system employing this alternative method would pre-screen a fifth sequence after processing the fourth sequence. This fifth sequence would contain the width values 91 labeled with sequence numbers 97 five through twenty-two, such that this fifth sequence contains width values 91 from both the first and second scans. The applicable preceding steps may be repeated for each sequence occurring in the width signal.

In accordance with the systems disclosed herein, only data that is identified to potentially represent a bar code is output to the decoder. The decoder does not process data that is determined not to potentially represent a bar code, reducing the amount of data that would otherwise be processed by the decoder and increasing the efficiency of the decoding process.

While embodiments and applications of the present invention have been shown and described, it would be apparent to one skilled in the art that modifications are possible without departing from the inventive concepts herein. The invention, therefore, is not to be restricted except in the spirit of the claims that follow.

What is claimed is:

1. A method for pre-screening data read by a bar code reader, comprising the steps of:
   receiving a width signal comprised of width values that are indicative of widths of light areas and dark areas read from a target;
   selecting a sequence of width values from the width signal, wherein the sequence contains at least three width values occurring consecutively in the width signal, and wherein the sequence comprises a number of subsequences of width values, each subsequence containing a number of consecutive width values; and
   determining whether all subsequence ratios contained in said sequence are within a range of acceptable sum ratios, each subsequence ratio being a ratio of a width of a subsequence to a width of another subsequence, and wherein said range is bounded by a maximum sum ratio and a minimum sum ratio.

2. The method of claim 1, further comprising the steps of:
   outputting from a detector a detector signal that is indicative of said light areas and said dark areas of said target, and
   converting said detector signal to said width signal using a signal converter.

3. The method of claim 2 wherein said step of converting said detector signal to said width signal comprises the step of detecting transitions between positive and negative peaks in the detector signal.

4. The method of claim 2 wherein said step of converting said detector signal to said width signal comprises the step of detecting crossings of a threshold signal.

5. The method of claim 2 wherein said detector is a charge coupled device.

6. The method of claim 1, further comprising the step of outputting to a decoder the width values contained in the sequence when all the subsequence ratios contained in the sequence are within the range of acceptable sum ratios.

7. The method of claim 6, wherein only width values that have not previously been output to the decoder are output to the decoder.

8. The method of claim 6, further comprising the step of using the decoder to attempt to decode said width values output to the decoder.

9. The method of claim 1, wherein said determining step comprises:
   determining subsequence sums for each of said subsequences contained in said sequence, each subsequence sum comprising a sum of the width values contained in the subsequence;
   identifying a maximum subsequence sum;
   identifying a minimum subsequence sum;
   calculating a sum ratio of the maximum subsequence sum and the minimum subsequence sum; and
   comparing said sum ratio to said range of acceptable sum ratios.

10. The method of claim 9, further comprising the step of outputting to a decoder the width values contained in said sequence if said sum ratio is within the range of acceptable sum ratios.

11. The method of claim 9, wherein:
    said step of calculating a sum ratio comprises dividing said maximum subsequence sum by said minimum subsequence sum; and
    said comparing step comprises determining whether or not said sum ratio is less than or equal to said maximum sum ratio.

12. The method of claim 11, further comprising the step of outputting to a decoder the width values contained in said sequence if said sum ratio is less than or equal to said maximum sum ratio.

13. The method of claim 9, wherein:
    said step of calculating a sum ratio comprises dividing said minimum subsequence sum by said maximum subsequence sum; and
    said comparing step comprises determining whether or not said sum ratio is greater than or equal to said minimum sum ratio.

14. The method of claim 13, further comprising the step of outputting to a decoder the width values contained in said sequence if said sum ratio is greater than or equal to said minimum sum ratio.

15. The method of claim 1, wherein said number of width values contained in each subsequence is one, and wherein each subsequence width is a value of the one width value contained in each subsequence.

16. The method of claim 1, wherein said number of width values contained in each subsequence is two, and wherein each subsequence width is a sum of the two width values contained in each subsequence.

17. The method of claim 1, wherein said number of width values contained in each subsequence is at least three, and wherein each subsequence width is a sum of the at least three width values contained in each subsequence.

18. The method of claim 9, further comprising the step of outputting at least one of said subsequence sums to a memory, wherein said memory stores at least one of said subsequence sums.

19. The method of claim 1, wherein said maximum sum ratio is about 5 and wherein said minimum sum ratio is about 0.2, such that the range of acceptable sum ratios is about 0.2–5.0.

20. The method of claim 1, further comprising the step of repeating said determining step for a plurality of sequences, without regard to transitions in scans.

21. The method of claim 1, further comprising the step of repeating said determining step for each sequence that is contained entirely within a single scan, wherein said width signal further comprises information that is indicative of a transition in scans by which a new scan commences, and wherein each sequence in said scan overlaps at least one other sequence in said scan, such that each sequence in said single scan contains at least one width value that is contained in at least one other sequence in said single scan.

22. The method of claim 21, wherein said repeating step is performed for each scan.

23. The method of claim 1, further comprising the step of repeating said determining step for multiple sequences, wherein at least one sequence contains at least one width value that is contained in one scan and contains at least one width value that is contained in another scan.

24. The method of claim 1, further comprising the step of repeating said determining step for multiple sequences, wherein consecutive sequences are staggered by one width value, such that a subsequent sequence contains all width values contained in a previous sequence except a first width value of said previous sequence.

25. The method of claim 1, further comprising the step of repeating said determining step for multiple sequences, wherein consecutive sequences are staggered by the number of width values contained in a subsequence, such that a subsequent sequence contains all width values contained in a previous sequence except width values contained in a first subsequence of the previous sequence.

26. The method of claim 1, wherein each sequence is pre-screened consecutively.

27. The method of claim 1, further comprising the steps of:
outputting said width signal into a memory that stores at least one of said width values,
and outputting at least one of said width values from said memory.

28. The method of claim 1, further comprising the steps of:
outputting to a memory said width values contained in said sequence only if all the subsequence ratios contained in the sequence are within the range of acceptable sum ratios, and
outputting from said memory to a decoder said width values output to said memory.

29. The method of claim 1, wherein said method is carried out by a programmed digital computer.

30. The method of claim 1, wherein said light areas and dark areas are arranged on said target according to a format selected from the group of formats comprising Code 3 of 9, Interleaved 2 of 5 Code, Codabar, Code 93, Code 128, Universal Product Code (UPC), and European Article Numbering (EAN) bar code symbologies.

31. A method for pre-screening data read by a bar code reader, comprising the steps of:
selecting a sequence of at least three width values that are indicative of widths of light areas and dark areas of a target, said sequence comprising a number of subsequences of width values, each of said subsequences containing a number of width values,
determining subsequence sums for each of said subsequences of said width values contained in said sequence, wherein each of said subsequence sums is a sum of all of said width values contained in one of said subsequences,
identifying a maximum subsequence sum,
identifying a minimum subsequence sum,
calculating a sum ratio of said maximum subsequence sum and said minimum subsequence sum, and
determining whether or not said sum ratio is within a range of acceptable sum ratios, wherein said range is bounded by a maximum sum ratio and a minimum sum ratio.

32. The method of claim 31, wherein said step of determining subsequence sums comprises receiving at least one of said subsequence sums from a memory that stores at least one of said subsequence sums.

33. The method of claim 31, wherein:
said step of calculating a sum ratio comprises dividing said maximum subsequence sum by said minimum subsequence sum; and
said determining step comprises determining whether or not the sum ratio is less than or equal to the maximum sum ratio.

34. The method of claim 33, further comprising the step of outputting to a decoder said width values contained in said sequence if said sum ratio is less than or equal to the maximum sum ratio.

35. The method of claim 31, wherein:
said step of calculating a sum ratio comprises dividing said minimum subsequence sum by said maximum subsequence sum; and
said determining step comprises determining whether or not the sum ratio is greater than or equal to the minimum sum ratio.

36. The method of claim 35, further comprising the step of outputting to a decoder said width values contained in said sequence if said sum ratio is greater than or equal to the minimum sum ratio.

37. The method of claim 31, wherein said number of width values contained in each subsequence is one, and wherein each subsequence sum is a value of the one width value contained in each subsequence.

38. The method of claim 31, wherein said number of width values is two, and wherein each subsequence sum is a sum of the two width values contained in each subsequence.

39. The method of claim 31, wherein said number of width values is at least three, and wherein each subsequence sum is a sum of the at least three width values contained in each subsequence.

40. A method for pre-screening data read by a bar code reader, comprising the steps of:
supplying a width signal to a pre-screening system, said width signal comprising subsequences of width values, the width values being indicative of widths of light areas and dark areas of a target, and
determining, for a sequence of at least three consecutive width values, whether a sum ratio of a width of a widest subsequence containing at least one dark area or light area and a width of a narrowest subsequence containing at least one dark area or light area is within a range of acceptable sum ratios.

41. The method of claim 40, wherein said widest subsequence and said narrowest subsequence each contain one dark area or one light area.

42. The method of claim 40, wherein said widest subsequence and said narrowest subsequence each contain one dark area and one light area.

43. The method of claim 40, wherein said widest subsequence and said narrowest subsequence each contain a total of at least three light areas and dark areas.

44. The method of claim 40, further comprising the step of outputting to a decoder said width values of said sequence if said sum ratio of said width of said widest subsequence and said width of said narrowest subsequence is within a range of acceptable sum ratios.

45. A bar code reader for identifying potential bar code data, said bar code reader comprising a pre-screening system that:
receives a width signal comprised of width values that are indicative of widths of light areas and dark areas read from a target;
selects a sequence of width values from the width signal, wherein the sequence contains at least three width values occurring consecutively in the width signal, and wherein the sequence comprises a number of subsequences of width values, each subsequence containing a number of consecutive width values; and
determines whether all subsequence ratios contained in said sequence are within a range of acceptable sum ratios, each subsequence ratio being a ratio of a width of a subsequence to a width of another subsequence, and wherein said range is bounded by a maximum sum ratio and a minimum sum ratio.

46. The bar code reader of claim 45, further comprising:
a detector for detecting light reflected off said target, said detector outputting a detector signal that is indicative of said light areas and said dark areas read from said target; and
a signal converter for converting said detector signal to said width signal.

47. The bar code reader of claim 46, wherein said signal converter comprises a width measurer that measures relative widths of said light areas and said dark areas of said target.

48. The bar code reader of claim 46, wherein said signal converter comprises an amplifier and a noise reduction block connected with said detector.

49. The bar code reader of claim 46, wherein said signal converter comprises an edge detector.

50. The bar code reader of claim 46, wherein said detector comprises a charge-coupled device (CCD).

51. The bar code reader of claim 46, wherein said detector comprises a linear array of photosensitive elements.

52. The bar code reader of claim 46, wherein said detector comprises a two-dimensional array of photosensitive elements.

53. The bar code reader of claim 46, wherein said detector comprises a CMOS sensor.

54. The bar code reader of claim 46, further comprising a memory connected between said signal converter and said pre-screening system, wherein said memory stores and outputs at least one of said width values.

55. The bar code reader of claim 46, further comprising a memory connected between said pre-screening system and said decoder, wherein said memory stores and outputs at least one of said width values contained in a sequence wherein all subsequence widths are within the range of acceptable sum ratios.

56. The bar code reader of claim 45, further comprising a memory connected with said pre-screening system, wherein said memory receives as input at least one of said subsequence widths, stores at least one of said subsequence widths, and outputs at least one of said subsequence widths.

57. The bar code reader of claim 45, further comprising a decoder that receives as input and attempts to decode the width values contained in said sequence when all the subsequence ratios contained in the sequence are within the range of acceptable sum ratios.

58. The bar code reader of claim 45, wherein said pre-screening system comprises:
a selector that selects said sequence of width values;
a summer that determines subsequence sums for each of said subsequences contained in said sequence, each subsequence sum comprising a sum of the width values contained in the subsequence;
an identifier that identifies a maximum subsequence sum in said sequence and identifies a minimum subsequence sum in said sequence;
a calculator that calculates a sum ratio of the maximum subsequence sum and the minimum subsequence sum; and
a comparer that compares said sum ratio to said range of acceptable sum ratios.

59. The bar code reader of claim 58, wherein:
the calculator calculates the sum ratio by dividing said maximum subsequence sum by said minimum subsequence sum; and
the comparer determines whether or not said sum ratio is less than or equal to said maximum sum ratio.

60. The bar code reader of claim 59, wherein said pre-screening system outputs said width values of said sequence if the sum ratio of said sequence is less than or equal to the maximum sum ratio.

61. The bar code reader of claim 58, wherein:
the calculator calculates said sum ratio by dividing said minimum subsequence sum by said maximum subsequence sum; and
the comparer determines whether or not said sum ratio is greater than or equal to said minimum sum ratio.

62. The bar code reader of claim 61, wherein said pre-screening system outputs said width values of said sequence if the sum ratio of said sequence is greater than or equal to the minimum sum ratio.

63. The bar code reader of claim 45, wherein said number of width values contained in each subsequence is one, and wherein each subsequence width is the value of the one width value contained in each subsequence.

64. The bar code reader of claim 45, wherein said number of width values is two, and wherein each subsequence width is a sum of said two width values contained in each subsequence.

65. The bar code reader of claim 45, wherein said number of width values is at least three, and wherein each subsequence width is the value of a sum of the at least three width values contained in each subsequence.

66. A computer readable medium having stored therein one or more sequences of instructions for identifying potential bar code data, said one or more sequences of instructions causing one or more processors to perform a plurality of acts, said acts comprising:
receiving a width signal comprised of width values that are indicative of widths of light areas and dark areas read from a target;
selecting a sequence of width values from the width signal, wherein the sequence contains at least three width values occurring consecutively in the width signal, and wherein the sequence comprises a number of subsequences of width values, each subsequence containing a number of consecutive width values; and
determining whether all subsequence ratios contained in said sequence are within a range of acceptable sum ratios, each subsequence ratio being a ratio of a width of a subsequence to a width of another subsequence, and wherein said range is bounded by a maximum sum ratio and a minimum sum ratio.

67. The computer readable medium of claim 66, wherein said acts further comprise the act of attempting to decode the width values contained in said sequence when all the subsequence ratios contained in the sequence are within the range of acceptable sum ratios.

68. The computer readable medium of claim 66, wherein said act of determining whether all subsequence ratios contained in said sequence are within a range of acceptable sum ratios further comprises the acts of:
determining subsequence sums for each of said subsequences contained in said sequence, each subsequence sum comprising a sum of the width values contained in the subsequence;
identifying a maximum subsequence sum in said sequence;
identifying a minimum subsequence sum in said sequence;
calculating a sum ratio of the maximum subsequence sum and the minimum subsequence sum; and
comparing said sum ratio to said range of acceptable sum ratios.

69. A bar code reader for identifying potential bar code data, said bar code reader comprising a pre-screening system comprising:

means for receiving a width signal comprised of width values that are indicative of widths of light areas and dark areas read from a target;

means for selecting a sequence of width values from the width signal, wherein the sequence contains at least three width values occurring consecutively in the width signal, and wherein the sequence comprises a number of subsequences of width values, each subsequence containing a number of consecutive width values; and means for determining whether all subsequence ratios contained in said sequence are within a range of acceptable sum ratios, each subsequence ratio being a ratio of a width of a subsequence to a width of another subsequence, and wherein said range is bounded by a maximum sum ratio and a minimum sum ratio.

70. The bar code reader of claim 69, further comprising means for attempting to decode the width values contained in said sequence when all the subsequence ratios contained in the sequence are within the range of acceptable sum ratios.

71. The bar code reader of claim 69, wherein said means for determining whether all subsequence ratios contained in said sequence are within a range of acceptable sum ratios comprises:

means for determining subsequence sums for each of said subsequences contained in said sequence, each subsequence sum comprising a sum of the width values contained in the subsequence;

means for identifying a maximum subsequence sum in said sequence;

means for identifying a minimum subsequence sum in said sequence;

means for calculating a sum ratio of the maximum subsequence sum and the minimum subsequence sum; and means for comparing said sum ratio to said range of acceptable sum ratios.

\* \* \* \* \*